Oct. 18, 1927.
C. H. PAGE
1,646,311
DEPTH INDICATOR
Filed Aug. 2, 1926
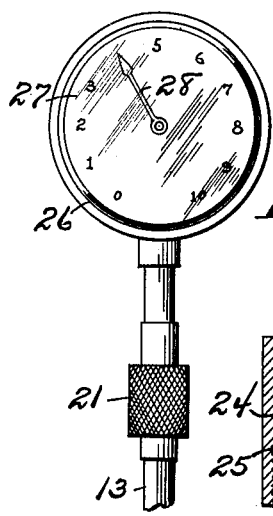
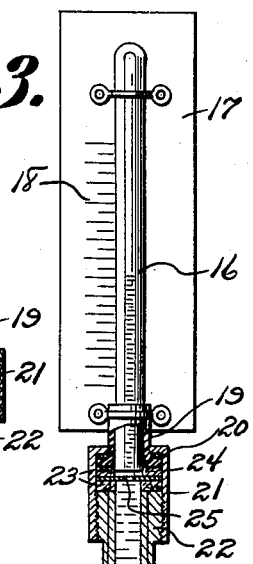
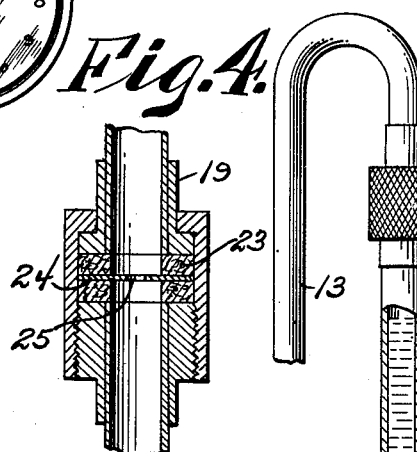
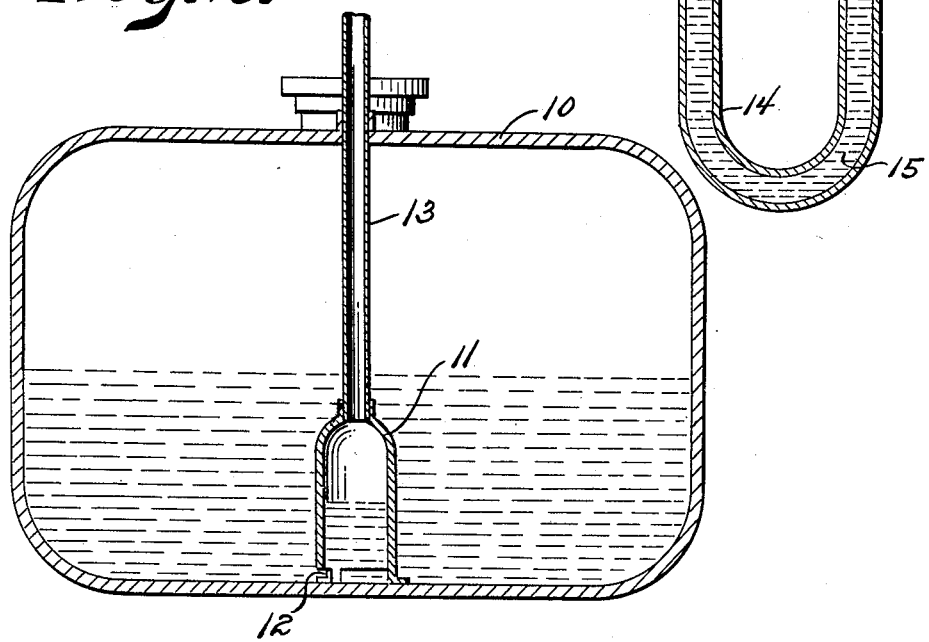
Charles H. Page INVENTOR
BY Victor J. Evans ATTORNEY
WITNESS:

Patented Oct. 18, 1927.

1,646,311

UNITED STATES PATENT OFFICE.

CHARLES H. PAGE, OF HATCHECHUBBEE, ALABAMA.

DEPTH INDICATOR.

Application filed August 2, 1926. Serial No. 126,704.

This invention relates to a depth indicating device, primarily intended for use on motor operated vehicles to indicate the level or amount of gasoline contained in the supply tank, the invention residing in the construction, combination and arrangement of parts as claimed.

In the drawing forming part of this application like numerals of reference indicate similar parts in the several views and wherein:

Figure 1 is a view of the pressure gauge.

Figure 2 is a sectional view through the supply tank showing the air pressure pipe associated therewith.

Figure 3 is a view partly in section showing another type of indicator and the fluid containing trap.

Figure 4 is a sectional view through the coupling or connection between the pressure pipe and indicator.

Referring to the drawing in detail 10 indicates a liquid containing tank, to the bottom of which is secured a bell 11 constituting an air chamber, which communicates with the tank through an opening 12 at a point immediately adjacent the bottom of the tank as shown. Rising from the bell and through an opening in the top of the tank is an air pressure pipe 13, the upper end of which is curved downwardly for association with a substantially U-shaped pipe 14 and adapted to contain a liquid 15. The other end of this trap 14 is coupled with a tube 16 forming part of an indicator, the latter also including the base 17 upon which the tube 16 is mounted, and which base is graduated as at 18. The tube 16 is preferably constructed of glass and has its lower end surrounded by a sleeve 19 terminating to provide a flange 20 which is received by a coupling 21. The upper end of the tube 16 is closed. This coupling is threaded on a bushing 22 surrounding the adjacent end of the trap 14, while arranged between the bushing 22 and the adjacent end of the tube 16 are washers 23. Positioned between these washers is a disk 24 having a restricted central opening 25 so that the liquid is retarded in its movement when passing from the pipe 14 into the tube 16, thereby rendering the gauge 26 more accurate and sensitive. This provides a practical connection between the trap and tube 16 as will be readily understood.

If desired a pressure gauge of the character shown in Figure 1 may be used in place of the gauge or indicator hereinabove described, the pressure gauge 26 including a graduated dial 27 and a pointer 28. This gauge is adapted to be coupled to the adjacent end of the pipe 13 in the same manner described for coupling the tube 16 with said trap.

In practice, when the tank 10 is filled with liquid, a portion of the latter enters the bell 11 through the opening 12, thereby compressing the air within the bell 11, and the pipe 13, this air pressure acting upon the liquid 15 contained within the trap, and forcing said liquid upwardly within the tube 16 a predetermined distance, thereby affording means whereby the quantity of gasoline contained within the tank may be readily determined. Of course the air pressure within the pipe 13 varies with the rise and fall of the level of the liquid within the tank 10, and correspondingly effects the rise and fall of the fluid within the tube 16. The indicator proper may be arranged upon the dash board of the vehicle or at any proper suitable location.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

A gage of the character described comprising an air pressure pipe, a substantially U-shaped liquid containing pipe, means for coupling one end of the last mentioned pipe to the adjacent end of the air pressure pipe, a plate having graduations thereon, a transparent tube supported on the plate, a sleeve surrounding the lower end of the tube and formed with an annular flange, spaced washers arranged between the tube and the adjacent end of the U-shaped pipe, a disk arranged between said washers and having a restricted central opening, and a coupling sleeve connecting the lower end of the tube with the adjacent end of the U-shaped pipe and reposing on said flange.

In testimony whereof I affix my signature.

CHARLES H. PAGE.